United States Patent [19]

Dachiku et al.

[11] Patent Number: 5,734,431
[45] Date of Patent: Mar. 31, 1998

[54] VIDEO CODING AND DECODING APPARATUS INCLUDING CORRESPONDING NONLINEAR COMPRESSION AND EXPANSION OF A MOTION COMPENSATION ERROR SIGNAL

[75] Inventors: Kenshi Dachiku, Kawasaki; Noboru Yamaguchi, Yashio; Toshiaki Watanabe, Yokohama, all of Japan

[73] Assignee: Kabushiki Kaisha Toshiba, Kawasaki, Japan

[21] Appl. No.: 633,695

[22] Filed: Apr. 19, 1996

[30] Foreign Application Priority Data

Apr. 20, 1995 [JP] Japan ................... 7-095441

[51] Int. Cl.[6] ............... H04N 7/12; H04N 11/02; H04N 11/04
[52] U.S. Cl. ............... 348/415; 348/407; 348/413; 348/416; 348/699
[58] Field of Search ............... 348/400, 401, 348/402, 407, 409, 410-413, 415, 416, 694

[56] References Cited

U.S. PATENT DOCUMENTS

| 4,933,761 | 6/1990 | Murakami et al. | 358/133 |
|---|---|---|---|
| 4,953,032 | 8/1990 | Suzaki et al. | 358/105 |
| 5,144,426 | 9/1992 | Tanaka et al. | 358/133 |
| 5,311,310 | 5/1994 | Jozawa et al. | 348/416 |
| 5,315,326 | 5/1994 | Sugiyama | 348/415 |
| 5,428,693 | 6/1995 | Murakami et al. | 382/232 |
| 5,438,374 | 8/1995 | Yan | 348/620 |
| 5,453,791 | 9/1995 | Ohli | 348/416 |
| 5,467,133 | 11/1995 | Lee | 348/402 |
| 5,481,310 | 1/1996 | Hibi | 348/413 |
| 5,510,840 | 4/1996 | Yonemitsu et al. | 348/402 |

*Primary Examiner*—Tommy P. Chin
*Assistant Examiner*—David R. Vincent
*Attorney, Agent, or Firm*—Oblon, Spivak, McClelland, Maier & Neustadt, P.C.

[57] ABSTRACT

A video coding apparatus includes a motion compensation circuit for motion-compensating a picture signal in a frame previous to a frame of video signals input for each frame, and generating a motion compensation picture signal, a nonlinear processing circuit for compressing a motion compensation error signal representing an error between each of the input video signal and the motion compensation picture signal at a compression rate which rises as the error increases, and outputting a motion compensation error signal, and a coding circuit for orthogonally transforming the motion compensation error signal output from the nonlinear difference circuit, quantizing the orthogonally-transformed signal, and coding the quantized signal.

17 Claims, 7 Drawing Sheets

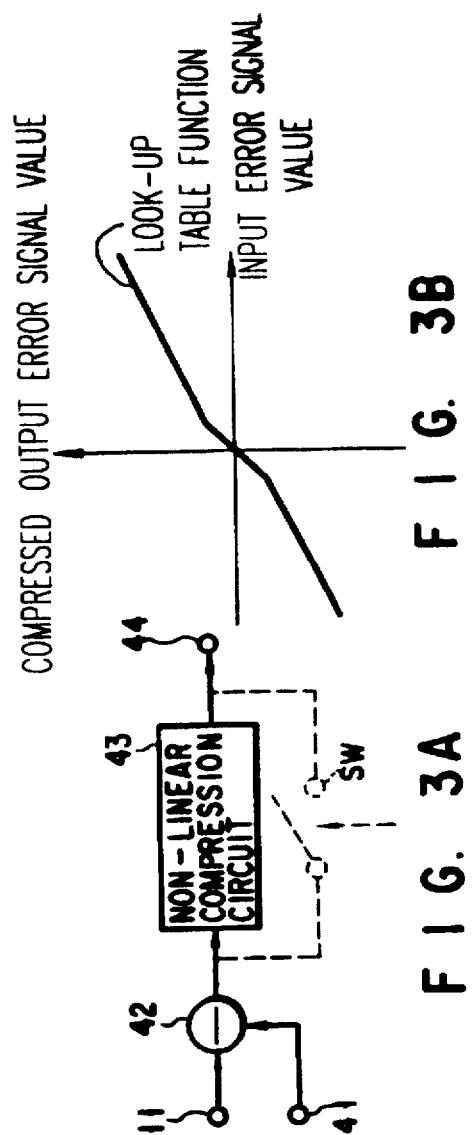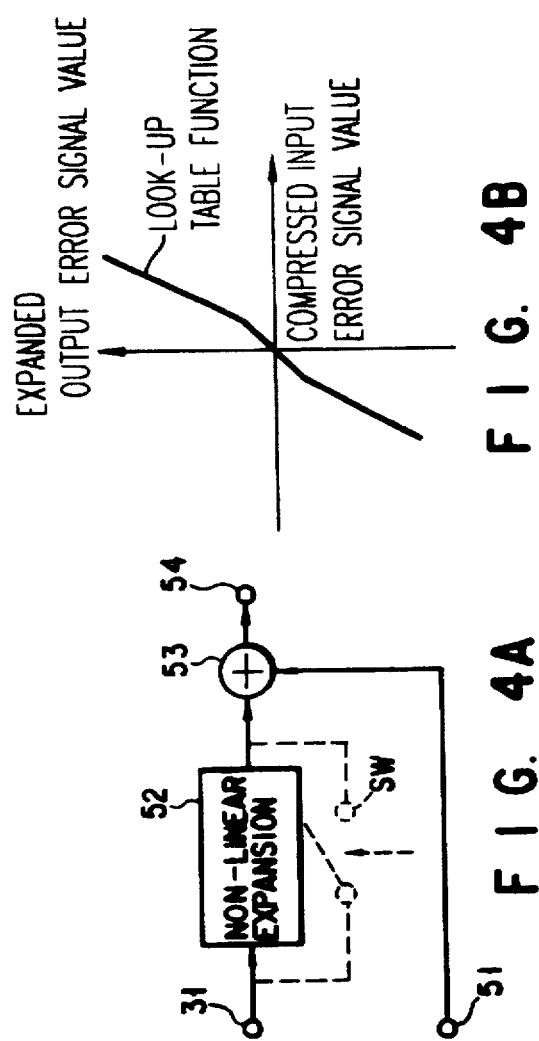

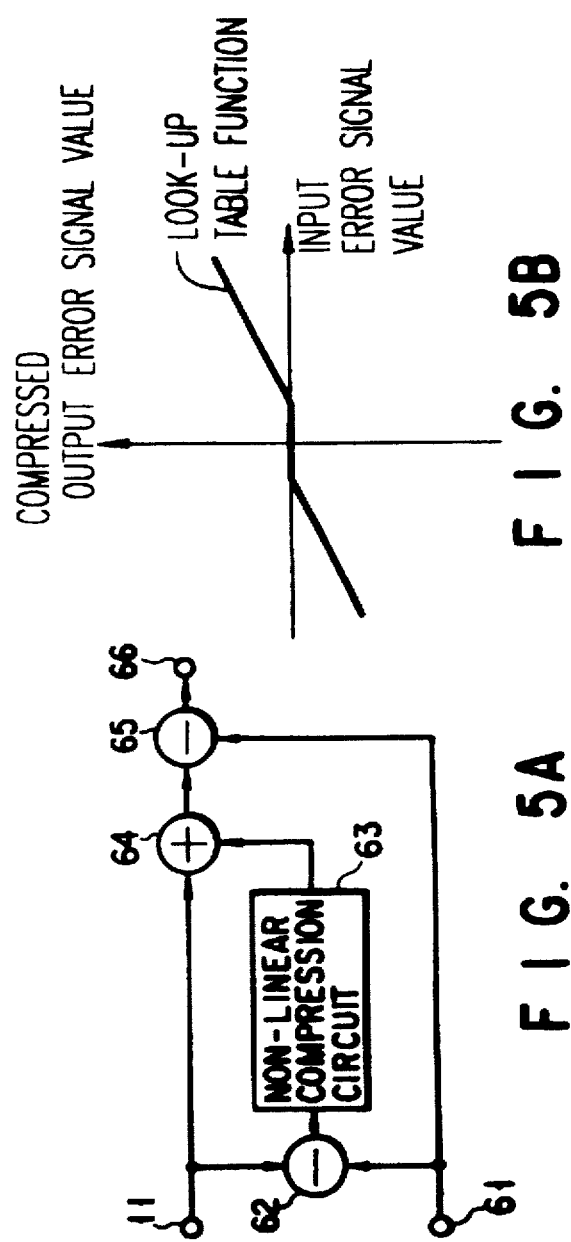

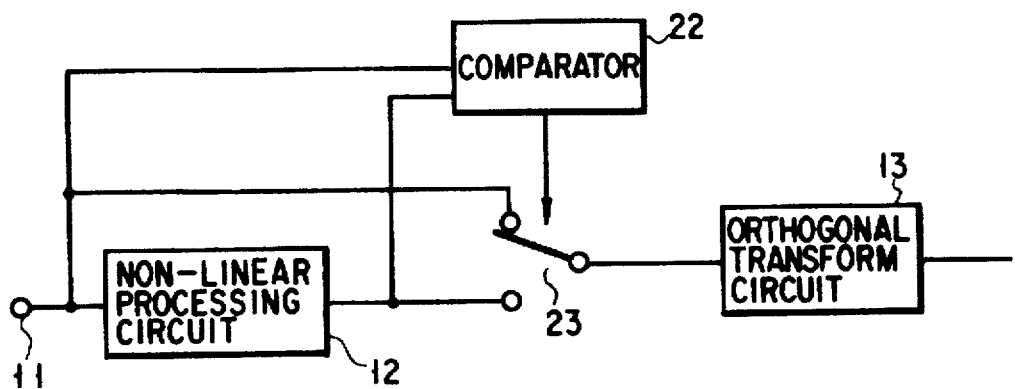
F I G. 6
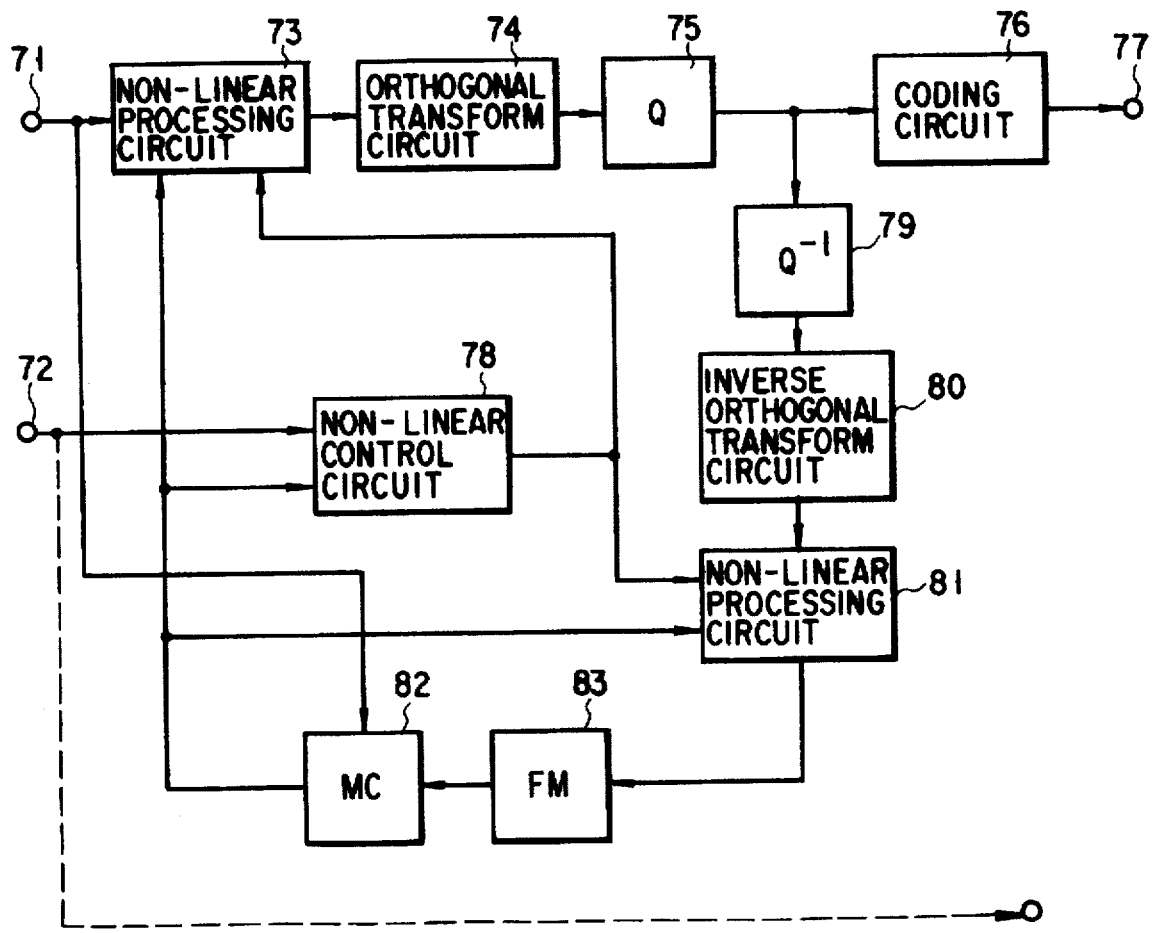
F I G. 7

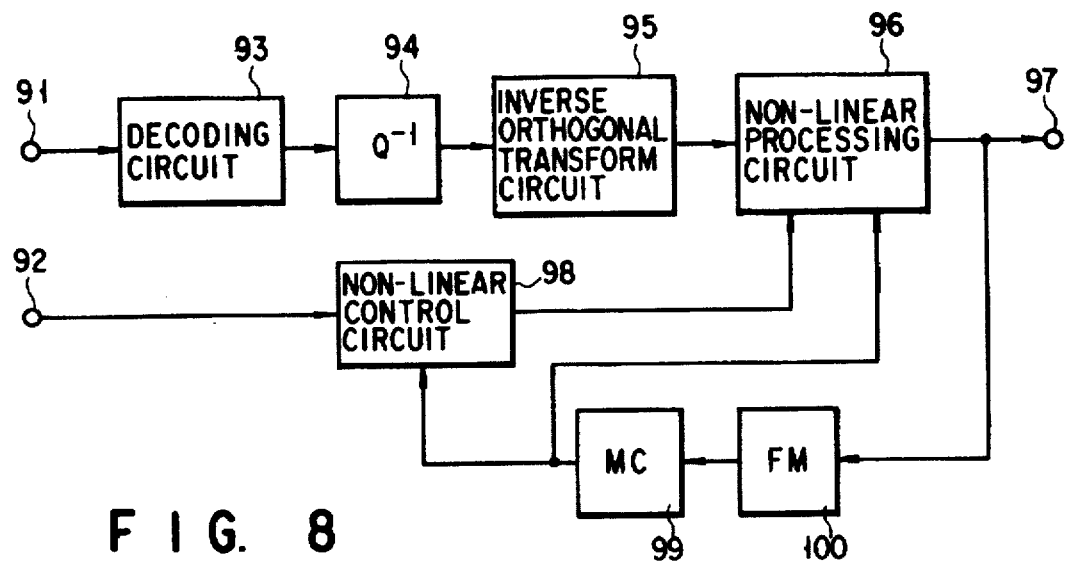
F I G. 8
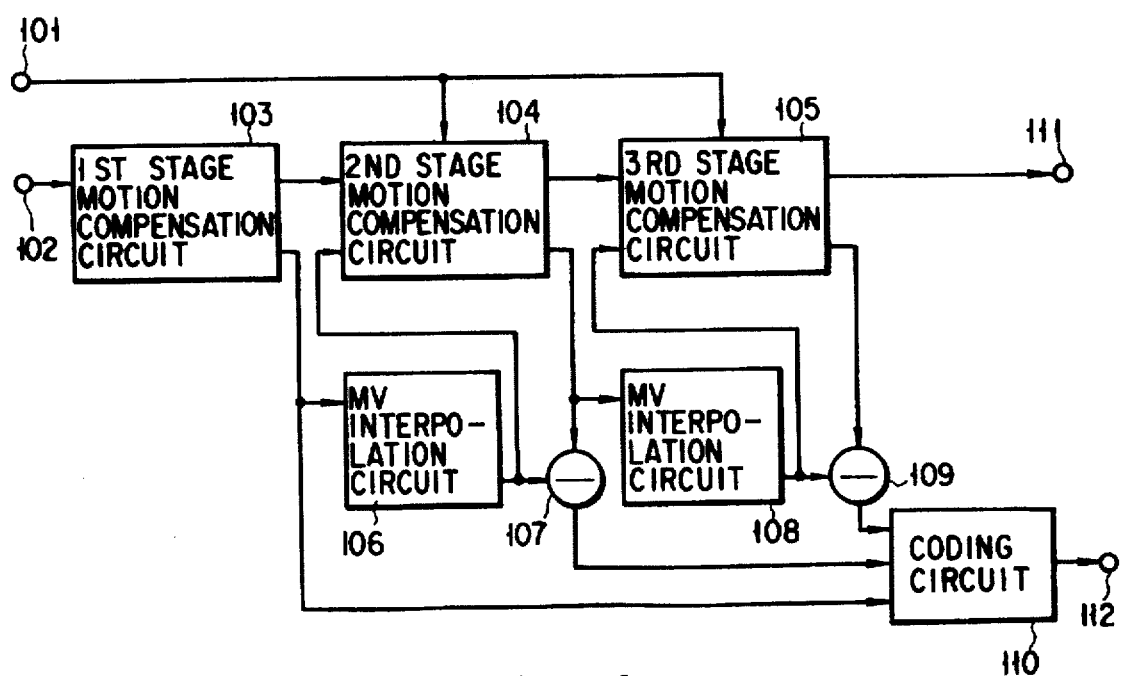
F I G. 9

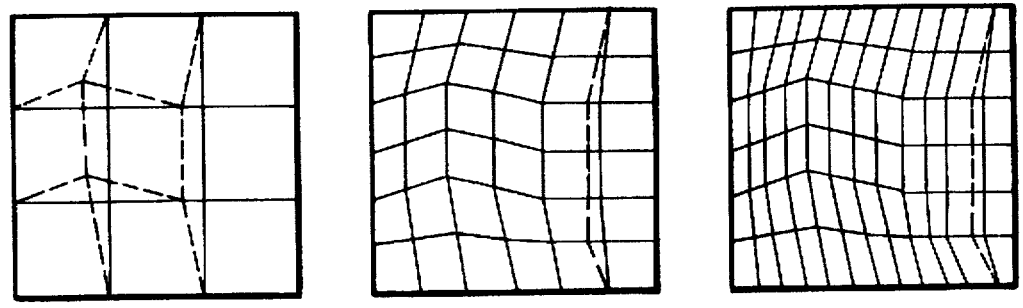
F I G. 10
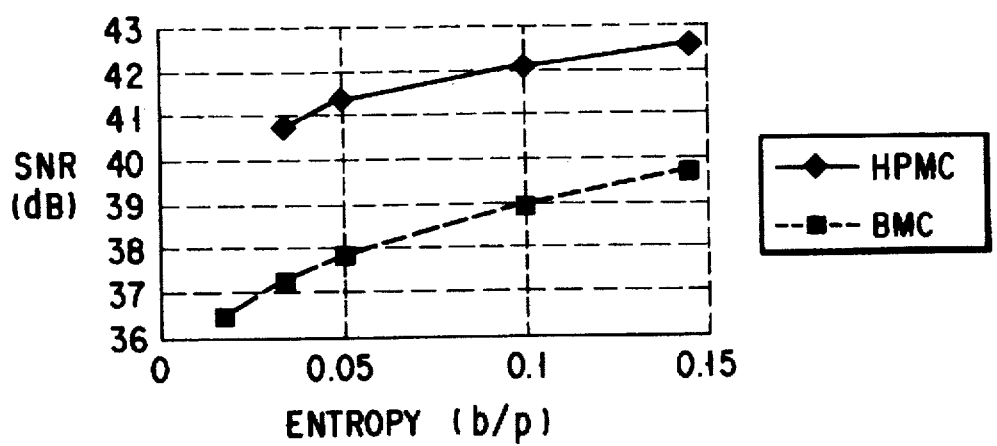
F I G. 11

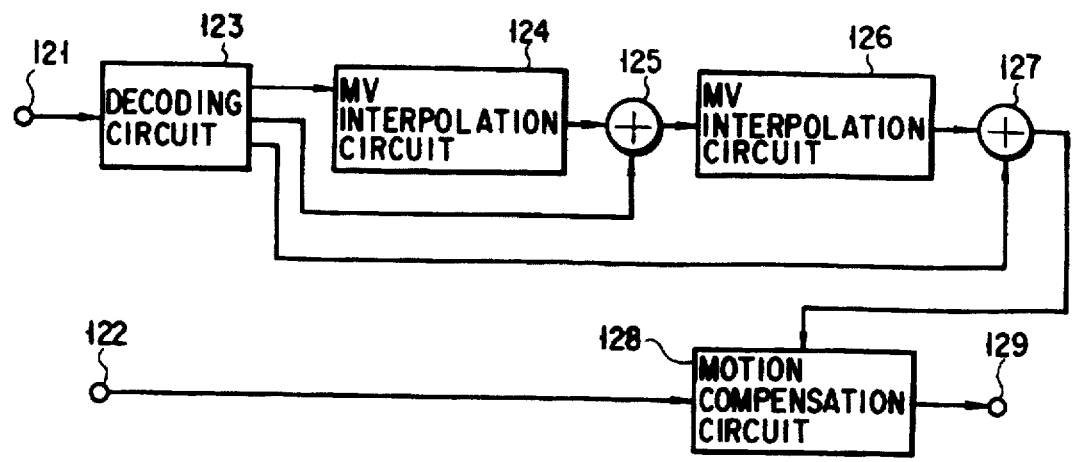
F I G. 12
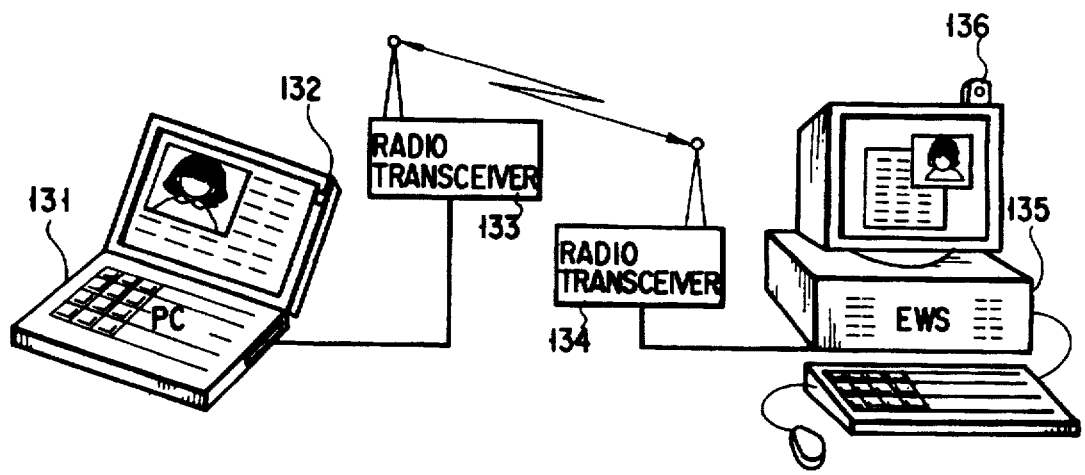
F I G. 13

VIDEO CODING AND DECODING APPARATUS INCLUDING CORRESPONDING NONLINEAR COMPRESSION AND EXPANSION OF A MOTION COMPENSATION ERROR SIGNAL

BACKGROUND OF THE INVENTION

1. Field of the Invention

The present invention relates to a video coding apparatus for compressing and coding a video signal, and a video decoding apparatus for decoding a coded signal to regenerate a video signal.

2. Description of the Related Art

Picture-coding techniques have been conventionally utilized for video communication, broadcasting, storage, etc. In still picture transmission such as facsimile, it is important for picture coding to transmit a coded signal as fast as possible. In video communication such as a teleconference and a videophone, it is important to do it in as narrow band as possible or at as low bit rate as possible. When picture information is recorded on a disk, a memory, or the like, the picture-coding techniques are adopted in order to efficiently record as much picture information as possible.

In a prior art video coding apparatus, an input video signal is divided into a plurality of blocks, and a motion vector, which represents a motion of the input video signal with respect to that in a local decoded frame, is detected for each of the blocks, and the video signal of the local-decoded frame is motion-compensated by the motion vector, thus generating a motion-compensated video signal. A block matching method is generally used to detect such a motion vector. According to this method, a motion vector whose motion compensation error signal is the smallest, is obtained by searching for the periphery of a position of the video signal of the local-decoded frame which corresponds to input signal block, for each of the blocks.

A motion compensation error signal is obtained by a difference between the motion-compensated video signal and input video signal. The error signal is orthogonally transformed, quantized, and variable-length-coded. This signal is output along with the motion vector information.

In a prior art video decoding apparatus, a coded signal is variable-length-decoded and dequantized. The dequantized signal is inversely orthogonally transformed. By adding, to this transformed signal, a video signal generated by motion-compensating a decoded video signal of the local-decoded frame using the vector information from the video coding apparatus, a decoded video signal is obtained.

As described above, in the prior art video coding apparatus, the motion compensation is carried out through the block matching method. In this method, however, the motion compensation error signal is not necessarily decreased to a sufficiently small value. For example, (1) when an input video signal moves so greatly as to exceed a range of search for the motion vector, (2) when a subject varies in brightness, (3) when an object rotates or transforms, and (4) when a subject newly appears within the frame, the motion-compensation is not performed correctly, thus increasing the motion consumption error signal and the amount of coded signals.

SUMMARY OF THE INVENTION

The present invention relates to a video coding apparatus and a video decoding apparatus capable of improving the precision of motion compensation and controlling the generation of meaningless codes.

The gist of the present invention is to encode a motion compensation error signal by nonlinear compression in order to control visually unimportant information.

According to one aspect of the present invention, there is provided a video coding apparatus comprising:

a motion compensation section for motion-compensating a video signal fetched previous to each of input video signals input for each predetermined unit, and generating a motion compensation picture signal;

a nonlinear processing section for nonlinearly compressing a motion compensation error signal indicative of an error between each of the input video signals and the motion compensation picture signal, and outputting a nonlinearly-compressed motion compensation error signal; and a coding section for coding the nonlinearly-compressed motion compensation error signal output from the nonlinear processing section.

According to another aspect of the present invention, there is provided a video decoding apparatus comprising:

a decoding section for decoding a coded nonlinear compression motion compensation error signal;

a nonlinear expanding section for nonlinearly expanding the nonlinear compression motion compensation error signal decoded by the decoding section and generating a motion compensation error signal;

a motion compensating section for motion-compensating a picture signal previously reconstructed to generate a motion compensation picture signal; and a reconstructing section for adding the motion compensation picture signal generated by the motion-compensating section and the motion compensation error signal generated by the nonlinear expanding section, and reconstructing a picture signal for each frame or each field.

As described above, a portion of a picture having a large motion compensation error, corresponds to those greatly moving, varying in brightness, rotating or transforming, and newly appearing within a frame, and such a portion is visually less important than a still portion. It is thus useless to code a motion compensation error signal of such an unimportant portion as well as that of an important portion.

According to the video coding apparatus of the present invention, a motion compensation error signal of a portion which has a large error and is not so visually important is prevented from increasing. By doing so, an amount of coded signals can be prevented from increasing without visually decreasing in picture quality.

If an important portion such as a face or a portion varying in brightness is present in a frame, it is desirable to vary the nonlinear compression characteristics in accordance with the position and brightness of the portion. More specifically, the compression rate is lowered in an important portion and a dark portion which is easy to be visually deformed, and it is prevented from increasing in the other portion, thus improving in picture quality and preventing coded signals from increasing.

According to the video decoding apparatus of the present invention, the signal so coded can correctly be decoded into a video signal by nonlinear expansion at an expansion rate which rises as an error becomes larger.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3A is a block diagram of one example of a nonlinear processing circuit of the apparatus shown in FIG. 1;

FIG. 3B is a diagram showing the nonlinear compression characteristics of the nonlinear processing circuit shown in FIG. 3A;

FIG. 4A is a block diagram of another example of a nonlinear processing circuit of the apparatus shown in FIG. 1;

FIG. 4B is a diagram showing the nonlinear expansion characteristics of the nonlinear processing circuit shown in FIG. 4A;

FIG. 5A is a block diagram of still another example of a nonlinear processing circuit of the apparatus shown in FIG. 1;

FIG. 5B is a diagram showing the nonlinear compression characteristics of the nonlinear processing circuit shown in FIG. 5A;

FIG. 6 is a block diagram showing part of a video coding apparatus according to another embodiment of the present invention;

FIG. 7 is a block diagram of a video coding apparatus according to still another embodiment of the present invention;

FIG. 8 is a block diagram of a video decoding apparatus according to still another embodiment of the present invention;

FIG. 9 is a block diagram showing a stage motion compensation circuit of a video coding apparatus according to yet another embodiment of the present invention;

FIG. 10 is a view for explaining stage motion compensation;

FIG. 11 is a graph showing the comparison between the performance of prior art block matching motion compensation and that of stage motion compensation of the present invention;

FIG. 12 is a block diagram showing the arrangement of a stage motion compensation circuit of a video decoding apparatus according to yet another embodiment of the present invention; and FIG. 13 is a view showing an example of a system incorporating both a video coding apparatus and a video decoding apparatus of the present invention.

DETAILED DESCRIPTION OF THE PREFERRED EMBODIMENTS

Embodiments of the present invention will now be described with reference to the accompanying drawings.

Figure 1:
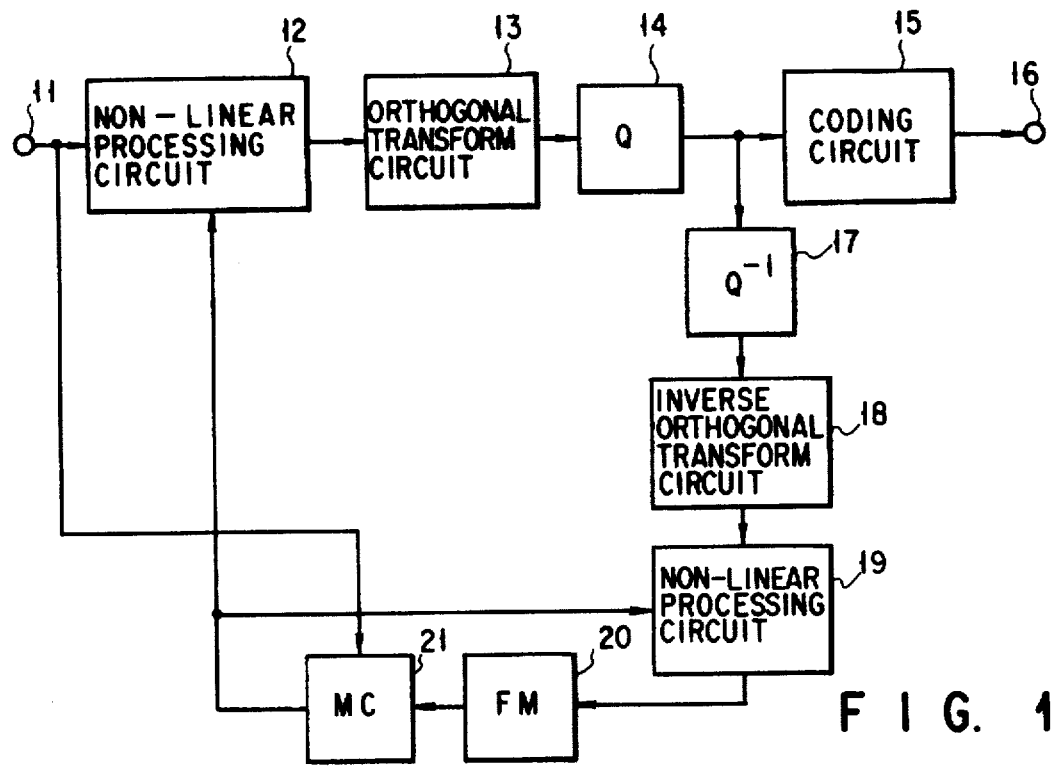
FIG. 1 is a block diagram of a video coding apparatus according to an embodiment of the present invention.

FIG. 1 is a block diagram showing the arrangement of a video coding apparatus according to an embodiment of the present invention. In this apparatus, an input terminal 11 supplied with a video signal to be coded, is connected to an input terminal of a nonlinear processing circuit 12 and that of a motion compensation circuit (MC) 21. An output terminal of the circuit 12 is connected to an input terminal of a coding circuit 15 through an orthogonal transform circuit 13 and a quantizer (Q) 14. An output terminal of the quantizer 14 is connected to a write terminal of a frame memory (FM) 20 through a dequantizer ($Q^{-1}$) 17, an inverse orthogonal transform circuit 18, and a nonlinear processing circuit 19. A read terminal of the frame memory 20 is connected to another input terminal of the motion compensation circuit 21. An output terminal of the circuit 21 is connected to another input terminal of the nonlinear processing circuit 12 and that of the nonlinear processing circuit 19.

The video signal input to the input terminal 11 is supplied to the nonlinear processing circuit 12, together with a motion compensation picture signal generated by motion-compensating a local-decoded picture signal corresponding to a previous frame and output from the motion compensation circuit 21. The nonlinear processing circuit 12 calculates a motion compensation error signal indicative of a difference between the input video signal and motion compensation picture signal, that is, an error in the motion compensation picture signal with respect to the input video signal. The error signal is compressed at a compression rate which becomes higher as the error increases. More specifically, when the error is smaller than a threshold value, the nonlinear processing circuit 12 outputs the motion compensation error signal as it is and, when it is larger, it compresses the error signal and outputs it. The motion corresponding to the error signal to be compressed is hard to compensate, in other words, it seems to correspond to the swaying of trees.

The motion compensation error signal, which is nonlinearly compressed by the nonlinear processing circuit 12, is transformed into an orthogonal transform signal by the orthogonal transform circuit 13, and it is quantized by the quantizer 14 and variable-length-coded by the coding circuit 15. The coded signal is output from an output terminal 16. As the orthogonal transform circuit, there are some types of DCT (discrete cosine transformation), wavelet transform, subband division, etc. The coded signal output from the output terminal 16 is detected by the motion compensation circuit 21, and transmitted to a transmission medium or a storage medium along with vector information which is variable-length-coded by another coding circuit (not shown).

The output signal of the quantizer 14 is also supplied to the dequantizer 17 and dequantized therein. The dequantized signal is transformed by the inverse orthogonal transform circuit 18 so as to have characteristics opposite to those obtained by the orthogonal transform circuit 13, thereby generating a motion compensation error signal. This motion compensation error signal is nonlinearly processed by the nonlinear processing circuit 19 to have characteristics opposite to those of the nonlinear processing circuit 12 and results in a locally-decoded video signal. In other words, the nonlinear processing circuit 19 adds the motion compensation video signal and the signal subjected to the nonlinear expansion processing in which an input motion compensation error signal is expanded at an expansion rate which rises as an error becomes larger, and a signal generated from the addition is output.

The local-decoded video signal output through the nonlinear processing circuit 19, is sent to the frame memory 20, and used in the motion compensation circuit 21 as a reference video signal corresponding to an input video signal of the next frame. In other words, this reference video signal corresponds to a signal of a frame previous to the frame of the input video signal, and the motion compensation circuit 21 motion-compensates for the reference video signal so as to approach the input video signal and outputs a motion compensation picture signal.

Figure 2:
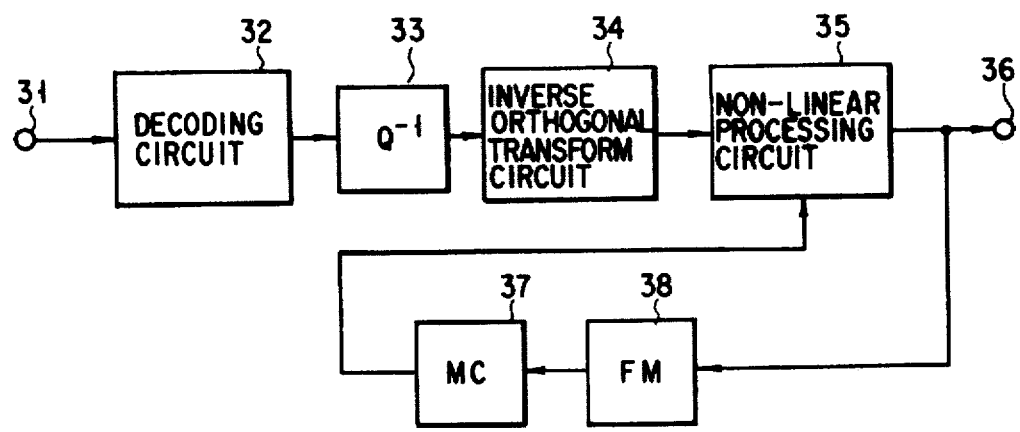
FIG. 2 is a block diagram of a video decoding apparatus according to another embodiment of the present invention.

FIG. 2 illustrates a video decoding apparatus according to another embodiment of the present invention, which corresponds to the video coding apparatus shown in FIG. 1. In this apparatus, an input terminal 31 is connected to an input terminal of a decoding circuit 32, and an output terminal of the circuit 32 is connected to an input terminal of a nonlinear processing circuit 35 via a dequantizer 33 and an inverse orthogonal transform circuit 34. An output terminal of the nonlinear processing circuit 35 is connected to an output terminal 36 and also connected to an input terminal of a motion compensation circuit 37 through a frame memory 38. An output terminal of the circuit 37 is connected to another input terminal of the nonlinear processing circuit 35.

In the video decoding apparatus described above, the input terminal 31 is supplied with the coded data transmitted from the video coding apparatus shown in FIG. 1 through the transmission medium or storage medium. The coded data is variable-length-decoded by the decoding circuit 32, dequantized by the dequantizer 33, and inverse-orthogonally transformed into a motion compensation error signal. This motion compensation error signal undergoes the nonlinear expansion processing in the nonlinear processing circuit 35 analogous to the nonlinear processing circuit 19 shown in FIG. 1, and is added to the motion compensation picture signal thereby to generate a decoded picture signal, which is to be output from the output terminal 36.

The decoded picture signal is also input to the frame memory 38, and used in the motion compensation circuit 37 as a reference picture signal of the next frame. The reference picture signal corresponds to a signal of a frame previous to the frame of the decoded picture signal, and the motion compensation circuit 37 motion-compensates for the reference picture signal based on motion vector information which is variable-length-decoded by another decoding circuit (not shown), thus outputting a motion compensation picture signal.

The nonlinear processing circuits 12 and 19 (FIG. 1) and 35 (FIG. 2), featuring the present invention, will now be described specifically.

FIG. 3A shows an example of the arrangement of the nonlinear processing circuit 12. The circuit 12 includes a subtracter 42 for calculating a difference between a video signal input from the input terminal 11 and a motion compensation picture signal input from the motion compensation circuit 21 through the input terminal 41. This difference is nonlinearly compressed by a nonlinear compression circuit 43, as indicated by the graph in FIG. 3B. The circuit 43 is thus constituted by, e.g., a look-up table having a data structure representing a nonlinear relationship between input and output as shown in FIG. 3B, i.e., a nonlinear compression characteristic wherein the compression rate increases as the difference becomes larger. The look-up table is designated using the difference calculated by the subtracter 42 as an address, and output data corresponding to the address is read out of the look-up table and supplied to the orthogonal transform circuit 13 as nonlinear compression data.

FIG. 4A is a block diagram showing an example of the structures of the nonlinear processing circuits 19 and 35. In this example, a motion compensation error signal input from the input terminal 31 is nonlinearly expanded by a nonlinear expansion circuit 52 such that, as shown in the graph of FIG. 4B, greatly compressed data is greatly expanded and slightly compressed data is slightly expanded. The linearly expanded signal is then added to a motion compensation video signal supplied from an input terminal 51 by means of an adder 53. Like the nonlinear compression circuit 43 shown in FIG. 3A, the circuit 52 is constituted by a look-up table having a data structure representing a nonlinear relationship between input and output as shown in FIG. 4B. The look-up table is designated using the compressed data as an address, and data corresponding to the address is output as expansion data.

FIG. 5A is another example of the arrangement of the nonlinear processing circuit 12 shown in FIG. 1. According to this example, a difference between a video signal from the input terminal 11 and a motion compensation picture signal from an input terminal 61 is calculated by a subtracter 62, and nonlinearly compressed by a nonlinear compression circuit 63 as indicated by the graph of FIG. 5B. In this compression, when the difference is small, i.e., the video signal slightly moves, the compression rate is zero. It is when the video signal moves more than a predetermined value that the difference is nonlinearly compressed. The nonlinearly compressed difference is added to a video signal from the input terminal 11 by an adder 64. A difference between the output signal of the adder 64 and the motion compensation picture signal is obtained by a subtracter 65, and output as compression data.

When a motion error is small, an output of the nonlinear compression circuit 63 is zero, and a difference between the input video signal and motion compensation picture signal is output from the subtracter 62 and used as compression data. When the motion error exceeds a predetermined value, the nonlinearly compressed difference is added to the input video signal, and the subtracter 62 subtracts the motion compensation picture signal from the added signal. The output signal of the subtracter 62 serves as compression data.

In the above-described embodiments, if no motion compensation can be executed by the motion compensation circuit 21 because of a change in scene, an input video signal from the input terminal 11 is directly input to the orthogonal transform circuit 13 but not through the nonlinear processing circuit 12, and encoded. Such a bypass operation can be performed by, e.g., switching in response to a signal indicative of incapability of motion compensation, which is supplied from the motion compensation circuit 21. This bypass operation is realized by the circuit shown in FIG. 6. The circuit of FIG. 6 includes a comparator 22 for comparing an input video signal and a nonlinearly compressed output signal of the nonlinear processing circuit 12. When the difference between these input and output signals exceeds a predetermined value, a bypass is selected by a switch 23 in response to an output signal of the comparator 22, with the result that the input video signal is supplied to the orthogonal transform circuit 13 but not through the nonlinear processing circuit 12.

FIG. 7 illustrates a video coding apparatus according to still another embodiment of the present invention. This apparatus is the same as that shown in FIG. 1, except that it includes a nonlinear control circuit 78. In the apparatus shown in FIG. 7, an input terminal 71 is connected to an input terminal of a nonlinear processing circuit 73, and an output terminal of the circuit 73 is connected to an output terminal 77 via an orthogonal transform circuit 74, a quantizer 75 and a coding circuit 76. An output terminal of the quantizer 75 is connected to an input terminal of a nonlinear processing circuit 81 through an inverse quantizer 79 and an inverse orthogonal transform circuit 80.

Another input terminal 72 is connected to an input terminal of a nonlinear control circuit 78, and an output terminal of the circuit 78 is connected to another input terminal of the nonlinear processing circuit 73 and that of the nonlinear processing circuit 81. An output terminal of the circuit 81 is connected to an input terminal of a motion compensation circuit (MC) 82 through a frame memory 83. An output terminal of the motion compensation circuit 82 is connected to another input terminal of the nonlinear processing circuit 73, that of the nonlinear control circuit 78, and that of the nonlinear processing circuit 81.

In the above-described apparatus, information for designating an area within a frame where a motion compensation error signal is not linearly compressed or expanded, is supplied from the input terminal 72 to the nonlinear control circuit 78. This area designating information can be set manually or automatically. When it is set automatically, an important area, for example, an area including a man's face is detected from the frame and designated as one not Nonlinearly compressed or expanded. The area designating information is output from an output terminal 84, as indicated by a broken line in FIG. 7, and multiplexed with coded data output from the coding circuit 76. The multiplexed data is then transmitted.

More specifically, when the area designating information is input to the nonlinear control circuit 78, the circuit 78 closes a switch SW, indicated by a wavy line of FIG. 3A, in timing when a video signal corresponding to the area designating information is input to the nonlinear processing circuit 73, thus preventing a corresponding motion compensation error signal from being compressed.

A method of designating a central part of a frame where an important portion such as a face is located, as an area where the nonlinear compression expansion is not performed, can be applied to the present invention and, in this case, area designating information need not be transmitted. In the designated area, the nonlinear compression expansion is not be completely but can be slightly performed.

The nonlinear control circuit 78 is also supplied with a motion compensation picture signal. Since a distortion is inconspicuous in a bright portion in view of visual characteristics, the nonlinear compression expansion is intensified in a bright portion of a motion compensation picture, while it is weakened in a dark portion thereof.

FIG. 8 shows a video decoding apparatus according to still another embodiment of the present invention, which corresponds to the video coding apparatus shown in FIG. 7. This apparatus is the same as that shown in FIG. 2, except that it includes a nonlinear control circuit 98. In the apparatus shown in FIG. 8, an input terminal 91 supplied with coded data, is connected to an input terminal of a decoding circuit 93, and an output terminal of the circuit 93 is connected to an input terminal of a nonlinear processing circuit 96 through a dequantizer 94 and an inverse orthogonal transform circuit 95. An output terminal of the circuit 96 is connected to an output terminal 97 and also connected to an input terminal of a motion compensation circuit 99 via a frame memory 100. An output terminal of the circuit 99 is connected to another input terminal of the nonlinear processing circuit 96 and to an input terminal of the nonlinear control circuit 98. Another input terminal of the circuit 98 is connected to an input terminal 92, and an output terminal thereof is connected to still another input terminal of the nonlinear processing circuit 96.

The nonlinear control circuit 98 controls the nonlinear processing circuit 96 so as not to nonlinearly expand a motion compensation error signal within an area designated by area designating information from the video coding apparatus shown in FIG. 7, and also does the nonlinear expansion characteristics based on the brightness of the motion compensation picture signal. In other words, the nonlinear control circuit 98 closes a switch SW indicated by a broken line of FIG. 4A to bypass a nonlinear expansion circuit 52. Thus, the motion compensation error signal is not nonlinearly expanded within the area, designated by the area designating information.

A block matching method can be applied to the motion compensation circuit 21 shown in FIG. 1. In this method, an amount of parallel movement is calculated for each block, and blocks of reference picture signals are moved in parallel, thereby executing motion compensation. However, in this method, when a target object is rotated, enlarged, deformed, etc., a motion vector is not correctly obtained, therefore, satisfactory motion compensation cannot be performed and a motion compensation error is increased. To improve the efficiency of the motion compensation, stage motion compensation is adopted in the present invention.

FIG. 9 shows a multi-stage motion compensation circuit of a video coding apparatus according to yet another embodiment of the present invention. The multi-stage motion compensation circuit includes first to third stage motion compensation circuits 103 to 105, first and second motion vector (MV) interpolation circuits 106 and 108, subtracters 107 and 109, and a coding circuit 110.

In the circuit shown in FIG. 9, an input terminal 101 is supplied with an input video signal for each frame, and another input terminal 102 is supplied with a reference video signal as a video signal of a previous frame. The first stage motion compensation circuit 103 estimates a motion vector with a relatively large block size (e.g., 16×16 pixels) and motion-compensates for the reference video signal using a first stage motion vector. The first MV interpolation circuit 106 interpolates the first stage motion vectors obtained by the circuit 103, and supplies a interpolated motion vector to the second stage compensation circuit 104.

The second stage motion compensation circuit 104 uses the interpolated motion vector obtained by the first MV interpolation circuit 106 as an initial vector and estimates a motion vector from the initial vector with a block size (8×8 pixels) which is half that used for the first stage motion compensation circuit 103, and then motion-compensates for the reference video signal again using the motion vector (second stage motion vector). The second MV interpolation circuit 108 interpolates the second stage motion vectors obtained by the circuit 104 and supplies the interpolated motion vector to the third stage motion compensation circuit 105.

The third stage motion compensation circuit 105 uses the interpolated motion vector obtained by the second MV interpolation circuit 108 as an initial vector and estimates a motion vector from the initial vector with a block size (4×4 pixels) which is half that used for the second stage motion compensation circuit 104, and motion-compensates for the reference picture signal using the motion vector (third stage motion vector). This motion compensation picture signal is output from an output terminal 111.

The motion compensation picture signal output from the output terminal 111, is sent to a motion compensation error signal generation circuit of the coding apparatus, e.g., a subtracter of the nonlinear processing circuit 12 shown in FIG. 1, to generate a motion compensation error signal corresponding to a difference between the motion compensation picture signal and the video signal supplied from the input terminal 101. The motion compensation error signal so generated is input to the coding circuit 15 via the orthogonal transform circuit 13 and quantizer 14 and coded therein, as shown in FIG. 1.

Motion vector information is variable-length-coded by the coding circuit 110 stage by stage. In coding of the motion vector information, the first stage motion vector is coded as it is, or a difference between the first stage motion vector and a motion vector of its adjacent block is coded. The subtracter 107 calculates a difference between the motion vector obtained from the first MV interpolation circuit 106 and the second stage motion vector estimated by the second stage motion compensation circuit 104. The reference (referred to as a second stage motion vector difference hereinafter) is then coded. The subtracter 109 calculates a difference between the motion vector obtained from the second MV interpolation circuit 108 and the third stage motion vector estimated by the third stage motion compensation circuit 105. The reference (referred to as a third stage motion vector difference hereinafter) is coded. The motion vector information so coded stage by stage, is multiplexed together with the motion compensation error signal coded by the coding circuit, and the multiplexed data is transmitted as coded data.

FIG. 10 is a view showing an example of the stage motion compensation described above. Referring to FIG. 10, the solid lines of the first stage indicate a lattice of the original block, while the broken lines thereof do a lattice which is so deformed that an input video signal and a reference picture signal are made the closest to each other. The amount of shift (variation) in lattice point between these lattices corresponds to a motion vector. The motion compensation is performed by mapping the reference video image on the lattice indicated by broken lines and deforming the lattice such that the broken lines coincide with the solid lines. In the second stage, an intermediate point between the lattices indicated by the broken lines at the second stage is interpolated thereby to reduce a block size to half in length and breadth. The lattice points at the second stage are defined as initial vectors from which a motion vector is estimated. In the third stage motion compensation, the reference video image undergoing the motion compensation on the second stage, is mapped on the lattice indicated by the broken line and deformed such that the broken lines coincide with the solid lines.

As described above, the motion compensation is performed for each stage; however, it can be done using only the motion vector of the final third stage and, in this case, the lattice is finally deformed into a square one by mapping the reference video signal on the lattice.

FIG. 11 is a graph showing a result of comparison in performance between prior art block matching motion compensation and stage motion compensation of the present invention. This comparison was done using a video called "Miss America" and a motion compensation error signal is linearly quantized to obtain entropy of a motion vector and a motion compensation error signal as well as SNR of a decoded video signal. In FIG. 11, the solid line shows stage motion compensation, while the broken line does block matching motion compensation. It is thus apparent from FIG. 11 that SNR in the stage motion compensation of the present invention is approximately 3.5 dB higher than that in the prior art block matching compensation.

FIG. 12 shows an example of a stage motion compensation circuit of a video decoding apparatus according to an embodiment of the present invention, which corresponds to the video coding apparatus shown in FIG. 9. The stage motion compensation circuit includes a decoding circuit 123, first and second motion vector (MV) interpolation circuits 124 and 126, adders 125 and 127, and a motion compensation circuit 128.

An input terminal 121 is supplied with motion vector information separated from the coded data which is transmitted, as shown in FIG. 9, from the video coding apparatus having the stage motion compensation circuit, through the transmission or storage medium. The motion vector information, which corresponds to that coded stage by stage in the stage motion compensation circuit shown in FIG. 9, is input to a decoding circuit 123, by which the first stage motion vector, second stage motion vector difference and third stage motion vector difference are decoded. The first MV interpolation circuit 124 interpolates an intermediate motion vector into between the first stage motion vectors, and the adder 125 adds a motion vector obtained by the interpolation is added to the second stage motion vector difference into a second stage motion vector. The second MV interpolation circuit 126 interpolates an intermediate point in between into the second stage motion vectors. The adder 127 adds a motion vector obtained by the interpolation to the third stage motion vector difference into a third stage motion vector. By this third stage motion vector, a reference picture signal supplied from another input terminal 122 is motion-compensated in the motion compensation circuit 128 and output from an output terminal 129 as a motion compensation picture signal.

Still another input terminal (not shown) is supplied with a motion compensation error signal separated from the coded data which is transmitted, as shown in FIG. 9, from the video coding apparatus having the stage motion compensation circuit, through the transmission or storage medium. This motion compensation error signal is decoded by a first decoding circuit (not shown). The first decoding circuit includes, for example, equivalents for the decoding circuit 32, dequantizer 33 and inverse orthogonal transform circuit 34, as shown in FIG. 2. The motion compensation error signal decoded by the first decoding circuit and the motion compensation picture signal output from the output terminal 129 are added to each other by an adder circuit (not shown) thereby to generate a decoded picture signal. The decoded picture signal is output from another output terminal (not shown), and input as a reference picture signal to the input terminal 122 through a frame memory.

An applied example of the present invention will now be described more specifically with reference to FIG. 13. FIG. 13 illustrates a system incorporating a video coding apparatus and a video decoding apparatus according to the present invention. In this system, a video signal supplied from a camera 132 provided in a PC (personal computer) terminal 131, is coded by a video coding apparatus included in the PC terminal 131 and modulated by a radio transceiver 133. The modulated signal is transmitted to a radio transceiver 134 over a radio wave and supplied to an EWS (work station) 135 of a center. The signal is decoded by a video decoding apparatus included in the EWS 135 and then displayed.

On the other hand, a video signal supplied from a camera 136 of the EWS 135 is coded by a video coding apparatus included in the EWS 135 and modulated by the radio transceiver 134. The modulated signal is transmitted to the radio transceiver 133 over a radio wave and sent to the PC terminal 131. The signal is decoded by a video decoding apparatus included in the PC terminal and then displayed.

The video coding and decoding apparatuses included in the PC terminal 131 and EWS 135 can be replaced with software. In the above example, the coded signal is transmitted over a radio wave; however, it can be done using a wire such as a telephone line. The EWS 135 on the center side not only codes and transmits an input video signal in real time, but also can store a previously-coded video signal in a disk to constitute a data base and transmit video data by request of the PC terminal 131. The PC terminal 131 not only decodes the received data in real time, but also can display a video even by itself by inserting a memory card to which coded data is written.

As described above, according to the present invention, by controlling a signal with a large motion compensation error, which is not so visually important, the amount of coded data can be prevented from increasing without visually degrading the quality of video.

Furthermore, according to the present invention, the motion compensation is performed stage by stage from a large block to a small one and thus a correct motion vector can easily be obtained, so that the motion compensation can be improved. Since the motion vector information is coded stage by stage, it can be done with great efficiency, and a video signal of high quality can be transmitted with a small amount of coded signals.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A video coding apparatus comprising:
    a source of a local-decoded picture signal corresponding to a previous picture signal of a video signal received by the video coding apparatus for processing;
    a motion compensation unit having one input receiving the video signal and another input receiving the local-decoded picture signal from said source and generating a motion compensation picture signal responsive to each of the input signals;
    a nonlinear processing unit having one input receiving the video signal and another input receiving the motion compensation picture signal and taking the difference between the received video signal and the received motion compensation picture signal to form a motion compensation error signal and nonlinearly compressing the motion compensation error signal with a compression rate that increases as the difference between the video signal and the motion compensation picture signal increases and outputting a nonlinearly-compressed motion compensation error signal; and
    a coding unit connected to receive the further processed nonlinearly-compressed motion compensation error signal output from said nonlinear processing unit and coding the received signal representing compressed motion compensation error.

2. The video coding apparatus according to claim 1, wherein said source of a local-decoded picture signal comprises:
    a local decoder receiving and decoding the coded nonlinearly-compressed motion compensation error signal from the coding unit to generate a local-decoded signal corresponding to the nonlinearly-compressed motion compensation error signal;
    a picture reconstruction circuit having one input receiving the local-decoded signal generated from said local decoder and a first circuit portion for nonlinearly expanding the local-decoded signal to form a local-expanded signal, a second input for receiving the output from the motion compensation unit and a second circuit portion adding the local-expanded signal with the motion compensation picture signal at the second input to form a picture signal corresponding to a frame or a field of the video signal for processing.

3. The video coding apparatus according to claim 2, wherein said picture reconstruction circuit first circuit portion includes a nonlinear expansion circuit to generate the local-expanded signal and the second circuit portion includes an addition circuit adding the local-expanded signal output from said nonlinear expansion circuit to the motion compensation picture signal at the second input to reconstruct a picture signal corresponding to a field or frame of the video signal, and a memory for storing the reconstructed picture signal from said addition circuit.

4. The video coding apparatus according to claim 1, wherein said nonlinear processing unit includes a subtraction circuit for determining the difference between the video signal received for processing and the motion compensation picture signal and a nonlinear compression circuit for nonlinearly compressing the difference signal output from said subtraction circuit such that a compression rate rises as the difference becomes larger.

5. The video coding apparatus according to claim 4, wherein said nonlinear compression circuit includes a look-up table having a data structure controlling nonlinear compression circuit characteristics.

6. The video coding apparatus according to claim 1, wherein said nonlinear processing unit includes a first subtractor for determining the difference between the video signal received for processing and the motion compensation picture signal and outputting a difference signal, a nonlinear compression circuit for nonlinearly compressing the difference signal output from said first subtractor, an adder for adding a first-stage nonlinear compression motion compensation error signal of said nonlinear compression circuit to the video signal received for processing and outputting an addition output signal, and a second subtractor for subtracting the motion compensation picture signal from the addition output signal from said adder.

7. The video coding apparatus according to claim 6, wherein said nonlinear compression circuit includes a circuit portion inhibiting the difference signal from being compressed when a difference detector detects that the difference is lower than a predetermined value, and nonlinearly compresses the different signal when the difference detector detects that the difference exceeds the predetermined value.

8. The video coding apparatus according to claim 7, wherein said nonlinear compression circuit further comprises:
    an address circuit controlled by the difference detector; and
    a look-up table addressed by the address circuit when controlled by the difference detector indicating that the difference exceeds the predetermined value, said look-up table having a data structure for controlling nonlinear compression circuit characteristics in which a compression rate rises as the difference exceeds the predetermined value and increases relative to the predetermined value.

9. The video coding apparatus according to claim 1, wherein said nonlinear processing unit includes an area designation circuit for designating an area where the motion compensation area signal is not nonlinearly compressed, and said nonlinear compression circuit is controlled by said area designation circuit so that the area designated by said area designation circuit is not nonlinearly compressed.

10. The video coding apparatus according to claim 1, wherein said nonlinear processing unit includes a circuit portion determining a compression rate of the motion compensation error signal in accordance with brightness detected by a brightness detector relative to a particular picture area.

11. A video decoding apparatus comprising:
- a decoder for decoding a ceded nonlinear compression motion compensation error signal to output a decoded nonlinear compression motion compensation error signal;
- a nonlinear expansion unit receiving the decoded nonlinear compression motion compensation error signal and nonlinearly expanding the nonlinear compression motion compensation error signal with a expansion rate that increases as the difference between the video signal and the motion compensation picture signal increases to generate a motion compensation error signal;
- a source of reference picture signals comprising frames or fields of a video signal previously processed by the video decoding apparatus;
- a motion compensation unit receiving an input from said source of said reference picture signals to generate a motion compensation picture signal; and
- a reconstruction unit for adding the motion compensation picture signal generated by said motion compensation unit and the motion compensation error signal generated by said nonlinear expansion unit, to reconstruct a picture signal on a video frame or field basis.

12. The video decoding apparatus according to claim 11, wherein said nonlinear expansion unit includes a look-up table portion and an address circuit controlled by the motion compensation error signal, said look-up table having a data structure representing nonlinear expansion unit characteristics representing an expansion rate corresponding to a compression rate of the nonlinear compression motion compensation error signal.

13. The video decoding apparatus according to claim 11, wherein said source of reference picture signals includes a memory connected to the output of the nonlinear expansion unit, said memory storing the reference picture signal.

14. The video decoding apparatus according to claim 11, wherein said nonlinear expansion unit has a nonlinear expansion control circuit for preventing the nonlinear expansion unit from expanding the nonlinearly compression motion compensation error signal in an area designated by the nonlinear expansion control circuit.

15. The video decoding apparatus according to claim 11, wherein said nonlinear expansion unit includes a brightness detector and controller determining an expansion rate of the motion compensation error signal in accordance with a detected brightness of a picture area.

16. The video decoding apparatus according to claim 11, further comprising a control circuit for controlling expansion characteristics of said nonlinear expansion unit based on at least one of a position detected by a position detector and brightness detected by a brightness detector of the motion compensation error signal within a frame period of the video signal.

17. A video coding apparatus comprising:
- a source of a current video segment;
- a source of a previous video segment;
- a first-stage motion compensation unit connected to the source of the current video segment and the source of the previous video segment and responsive to a received current video segment and a received previous video segment to provide a motion compensation signal for motion compensating the previous video segment from the source of the previous video segment using a motion vector having a relatively large block size;
- an interpolation circuit, said interpolation circuit being connected to the first-stage motion compensation unit for interpolating the motion vector from the first-stage motion compensation unit;
- a second-stage motion compensation unit connected to the interpolation circuit for receiving the interpolated motion vector and to the first-stage motion compensation unit for motion compensating the motion compensation signal generated by the first-stage motion compensation unit using a motion vector of relatively small block size generated by estimation from the motion vector obtained from the interpolation circuit to generate a second motion compensation signal;
- a first coding unit for coding a motion compensation error signal representing an error between the current video segment and the motion compensation signal from the second-stage motion compensation unit to output a coded picture signal;
- a second coding unit for coding motion vector information at least as to the motion vectors of the stages and a difference between the interpolated motion vector of the interpolation circuit and the estimated motion vector to form an output coded motion vector signal; and
- a multiplexing unit for multiplexing the coded picture signal and the coded motion vector signal output from said first and second coding units and generating multiplexed coded data.

* * * * *